UNITED STATES PATENT OFFICE.

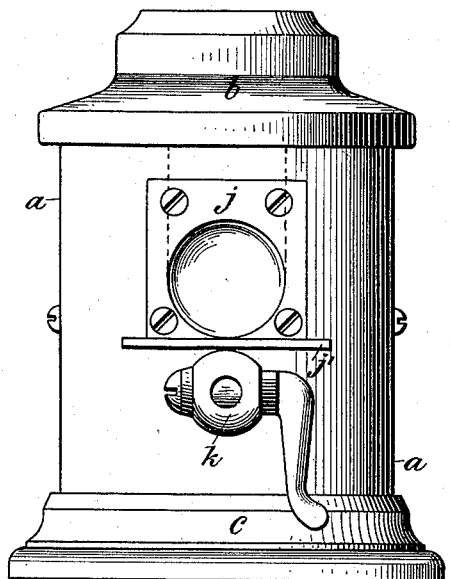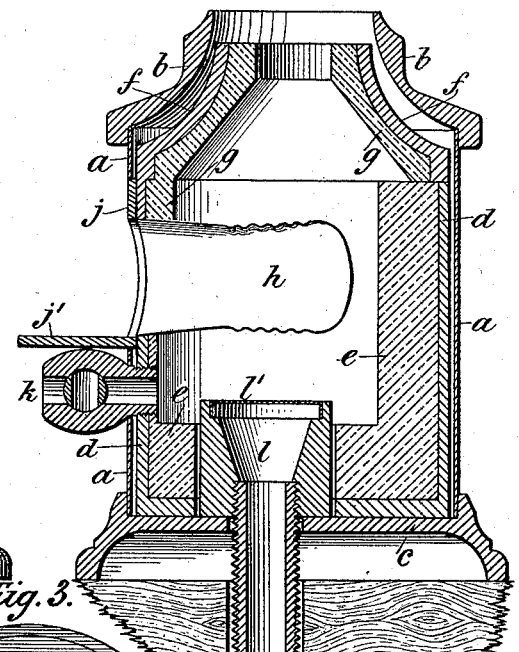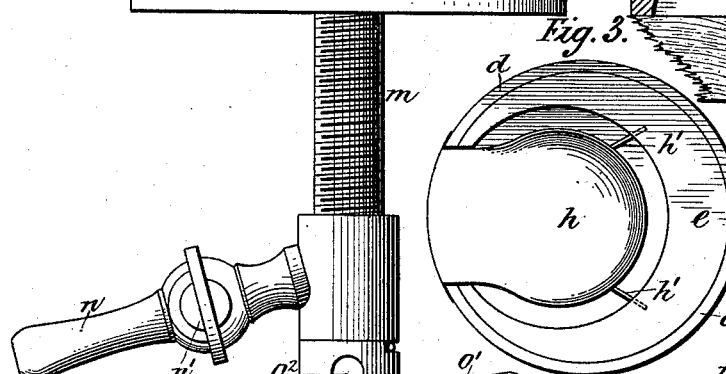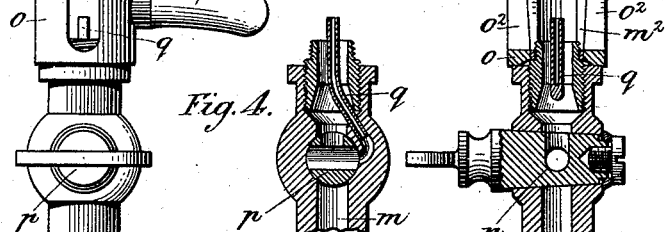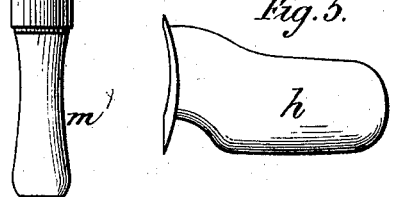

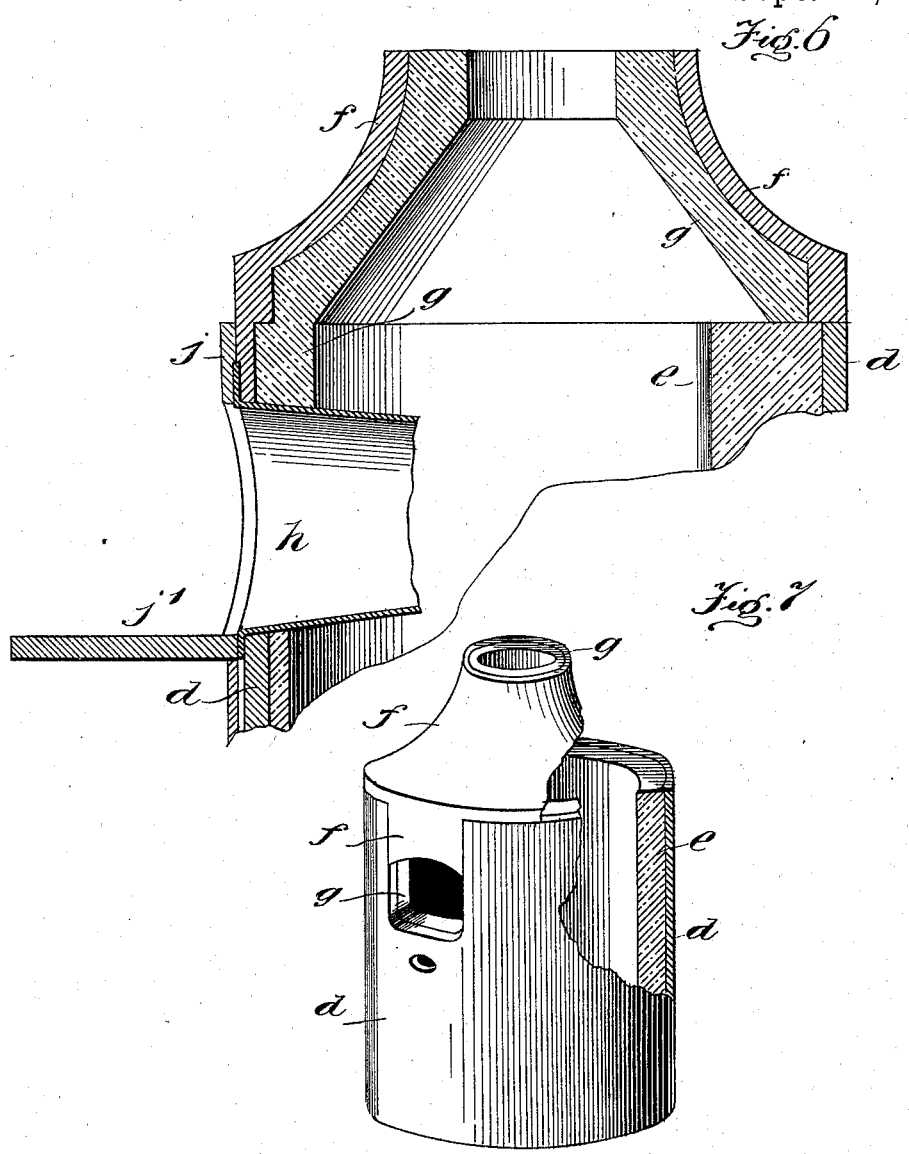

WILLIAM DALL, OF GLASGOW, SCOTLAND, ASSIGNOR TO THE DENTAL MANUFACTURING COMPANY, LIMITED, OF LONDON, ENGLAND.

DENTAL FURNACE.

SPECIFICATION forming part of Letters Patent No. 590,214, dated September 21, 1897.

Application filed February 1, 1897. Serial No. 621,517. (No model.)

*To all whom it may concern:*

Be it known that I, WILLIAM DALL, dental surgeon, a subject of the Queen of Great Britain, residing at 8 Newton Place, Charing Cross, Glasgow, Scotland, have invented a certain new and useful Furnace Suitable for Dentists, of which the following is a specification.

Figure 1 is a front elevation, and Fig. 2 a vertical section, of a furnace constructed according to this invention. Fig. 3 is a plan of the inner casing with the covers removed. Fig. 4 is a local section. Fig. 5 shows a modified form of muffle. Fig. 6 is a detail view, on an enlarged scale and in section, showing the manner of connecting the muffle to the casing. Fig. 7 is a detail view, in perspective and partly in section, of the casing and its lining and showing also the entrance to the muffle.

$a$ is an outer case provided with a cover $b$ and a foot $c$ to stand on a bench. $d$ is an inner casing lined with fire-clay $e$ and provided with a cover $f$, lined with fire-clay $g$.

$h$ is a muffle, of platinum or other suitable material. Its front enters a slot in the casing $d$ and fire-clay $e$, and is held there by a downward projection on the cover $f$ and fire-clay $g$, its flanged rim resting on the outside of the casing $d$.

$j$ is a metal plate fitting a square hole in the casing $a$ and screwed to the casing $d$ and cover $f$.

$j'$ is a table made in one piece with the plate $j$.

$h'$, Fig. 3, are two wires or pins fixed to the muffle $h$ and entering the fire-clay $e$, so supporting the rear end of the muffle without obstructing the passage round it.

$k$ is a cock closing a sight-hole through the casings $a$ and $d$ and fire-clay $e$.

$l$ is a burner consisting of a metal block having a conical hole in it covered with wire-gauze $l'$.

$m$ is a pipe screwing into the block $l$ and secured by a nut $m'$.

$n$ is a pipe directed slightly upward, connected to an air-blast, and carrying a cock $n'$.

$o$ is a circular shutter carrying a handle $o'$ and free to turn on the pipe $m$. It has openings $o^2$ in it, which can be made to coincide, as shown, with openings $m^2$ in the pipe $m$, or by turning the shutter the latter openings can be covered.

$m^\times$ is a pipe forming a prolongation of the pipe $m$.

$p$ is a three-way cock on the pipe $m^\times$. It is shown closed, so shutting off the gas, which is supplied at the bottom of the pipe $m^\times$. By giving it a quarter-turn the gas is turned full on, and by giving it a half-turn the main supply is cut off, but a small quantity of gas enters by the by-pass pipe $q$. When the full heat of the furnace is required, the gas is turned full on, the cock $n'$ on the air-blast pipe is opened, and the openings $m^2$ are closed. On the other hand, when only a moderate heat is required the gas is only admitted by the by-pass $q$, the cock $n'$ is closed, and the openings $m^2$ are uncovered. The burner then works as a Bunsen burner.

What I claim is—

1. The combination of a chamber, an opening in its side, a muffle projecting through the opening, a flange around the outside of the mouth of the muffle, and a plate holding the flange against the outside of the chamber.

2. The combination of a chamber, an opening in its side, a muffle projecting through the opening, a flange around the outside of the mouth of the muffle, a plate holding the flange against the outside of the chamber, and pins fixed to the rear of the muffle and entering the side of the chamber.

3. The combination of a casing, a lining of fire-clay, a slot in the casing and fire-clay, a muffle whose mouth fits the slot, a cover, a fire-clay lining to the cover, downward projections of the cover and fire-clay filling the slot above the muffle and a burner beneath the muffle.

4. The combination of a furnace, a burner in the furnace, a gas-supply pipe leading to the burner, an air-opening in the pipe, means for closing the opening, an air-blast pipe opening into the pipe between the air-openings and the burner, and means for shutting off the blast.

5. The combination of a chamber, a muffle projecting into it, a burner beneath the muffle, a pipe leading to the burner, openings admitting air into the pipe, means for closing them, an air-blast pipe opening into the pipe between the air-openings and the burner, means for shutting off the blast, and means for supplying gas to the pipe.

6. The combination of a chamber, a muffle projecting into it, a space round the sides and rear of the muffle, a burner beneath the muffle, a pipe leading to the burner, openings admitting air into the pipe, means for closing them, an air-blast pipe opening into the pipe between the air-openings and the burner, means for shutting off the blast, and means for supplying gas to the pipe.

7. The combination of a chamber, a muffle projecting into it, a space round the sides and rear of the muffle supports for the rear of the muffle, a burner beneath the muffle, a pipe leading to the burner, openings admitting air into the pipe, means for closing them, an air-blast pipe opening into the pipe between the openings and the burner, means for shutting off the blast and means for supplying gas to the pipe.

8. The combination of a casing, a lining of fire-clay, a slot in the casing and fire-clay, a muffle whose mouth fits the slot, a cover, a fire-clay lining to the cover, downward projections of the cover and fire-clay filling the slot above the muffle, a burner beneath the muffle, a pipe leading to the burner, an air-blast pipe connected to the pipe, means for cutting it off, openings admitting air into the pipe, means for closing them and means for supplying gas to the pipe.

9. The combination of a chamber, a muffle projecting into it, a burner beneath the muffle, a pipe leading to the burner, an air-blast pipe connected to the pipe, means for shutting off the blast openings admitting air into the first pipe, means for closing them and a three-way cock constructed and arranged to admit either a full supply or a partial supply of gas to the pipe or cut off the supply.

10. The combination of a chamber, a muffle projecting into it, a space round the sides and rear of the muffle, a burner beneath the muffle, a pipe leading to the burner, an air-blast pipe connected to the pipe, means for shutting off the blast, openings admitting air into the pipe, means for closing them and a three-way cock constructed and arranged to admit either a full supply or a partial supply of gas to the pipe or cut off the supply.

11. The combination of a chamber, a muffle projecting into it, a space round the sides and rear of the muffle, supports for the rear of the muffle, a burner beneath the muffle, a pipe leading to the burner, an air-blast pipe connected to the pipe, means for shutting off the blast, openings admitting air into the pipe, means for closing them and a three-way cock constructed and arranged to admit either a full supply or a partial supply of gas to the pipe or cut off the supply.

12. The combination of a casing, a lining of fire-clay, a slot in the casing and fire-clay, a muffle whose mouth fits the slot, a cover, a fire-clay lining to the cover, downward projections of the cover and fire-clay filling the slot above the muffle, a burner beneath the muffle, a pipe leading to the burner, an air-blast pipe connected to the pipe, means for shutting off the blast, openings admitting air into the pipe, means for closing them and a three-way cock constructed and arranged to admit either a full supply or a partial supply of gas to the pipe or cut off the supply.

13. The combination of a chamber, a muffle projecting into it, a burner beneath the muffle, a gas-pipe leading to the burner, a three-way cock interposed in the main passage of said pipe, and a supplementary side passage communicating with the cock and with the pipe between the burner and the cock.

WILLIAM DALL.

Witnesses:
W. PERCY CARPMALL,
W. M. HARRIS.